(12) United States Patent
Paul

(10) Patent No.: US 8,386,542 B1
(45) Date of Patent: Feb. 26, 2013

(54) WATCH CALCULATOR DEVICE FOR UNIT CONVERSIONS

(76) Inventor: Harinder Paul, Yuba City, CA (US)

(*) Notice: Subject to any disclaimer, the term of this patent is extended or adjusted under 35 U.S.C. 154(b) by 765 days.

(21) Appl. No.: 12/537,227

(22) Filed: Aug. 6, 2009

(51) Int. Cl.
*G04G 9/00* (2006.01)
*G06F 15/02* (2006.01)

(52) U.S. Cl. .......... 708/111; 708/130; 708/131

(58) Field of Classification Search .......... 708/111
See application file for complete search history.

(56) References Cited

U.S. PATENT DOCUMENTS

| | | | |
|---|---|---|---|
| 3,928,960 A * | 12/1975 | Reese | 708/111 |
| D243,751 S | 3/1977 | Price et al. | |
| 4,041,295 A | 8/1977 | Ido et al. | |
| 4,093,992 A | 6/1978 | Kawamura et al. | |
| 4,109,315 A | 8/1978 | Pan | |
| D249,243 S | 9/1978 | Salter | |
| 4,141,074 A | 2/1979 | Popper | |
| 4,158,285 A | 6/1979 | Heinsen et al. | |
| 4,228,516 A | 10/1980 | Johnston, Sr. | |
| D263,376 S | 3/1982 | Saito | |
| 4,686,643 A * | 8/1987 | Ishiwata | 708/206 |
| 5,265,009 A | 11/1993 | Colavita | |
| 7,136,138 B1 * | 11/2006 | Sekiguchi et al. | 349/162 |
| 2006/0140063 A1 * | 6/2006 | Galie et al. | 368/187 |

* cited by examiner

*Primary Examiner* — Henry Tsai
*Assistant Examiner* — Dean Phan

(57) ABSTRACT

A metric-converter watch device comprising a small watch-shaped housing having a display panel and a numeric keypad; and a microprocessor configured to perform mathematical operations and configured to convert a first English numeric value to a first metric numeric value and convert a second metric numeric value to a second English numeric value, wherein the microprocessor is operatively connected to a first conversion button, to a second conversion button, and the display panel, wherein the microprocessor is operatively connected to a battery, the battery being operatively connected to a solar panel disposed on the housing, wherein the solar panel provides power to re-charge the battery.

6 Claims, 3 Drawing Sheets

WATCH CALCULATOR DEVICE FOR UNIT CONVERSIONS

FIELD OF THE INVENTION

The present invention is directed to a device for converting units such as converting metric units to English units and English units to metric units. More particularly, the present invention is directed to a watch comprising a calculator that is configured to convert units.

BACKGROUND OF THE INVENTION

Individuals may often find themselves in need of converting units from metric units to English units or vice versa. For example, travelers may need to convert units when traveling in a foreign country. Also, many scientists must change between metric and English units on a constant basis. The present invention features a metric-converter watch device. The device is designed like a calculator watch but additionally comprises a means of converting numeric values from metric units to English units or vice versa.

Any feature or combination of features described herein are included within the scope of the present invention provided that the features included in any such combination are not mutually inconsistent as will be apparent from the context, this specification, and the knowledge of one of ordinary skill in the art. Additional advantages and aspects of the present invention are apparent in the following detailed description and claims.

DESCRIPTION OF PREFERRED EMBODIMENTS

Figure 1:
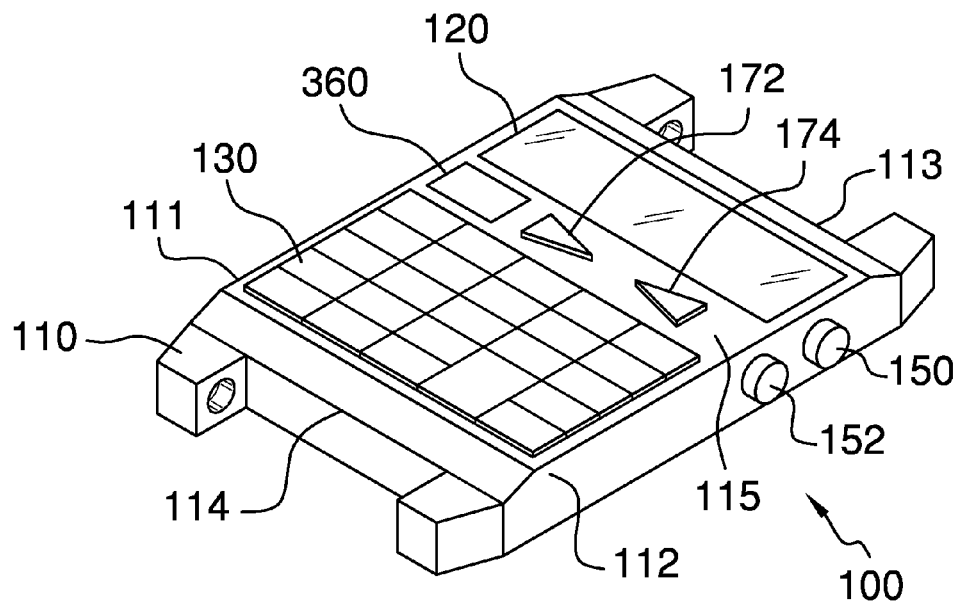
FIG. 1 is a top perspective view of the metric-converter watch device of the present invention.
Figure 2:
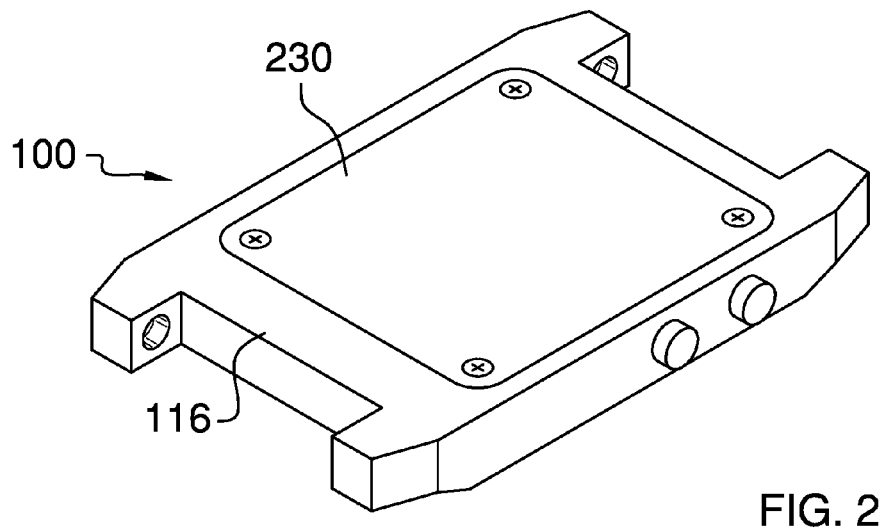
FIG. 2 is a bottom perspective view of the device of FIG. 1.
Figure 3:
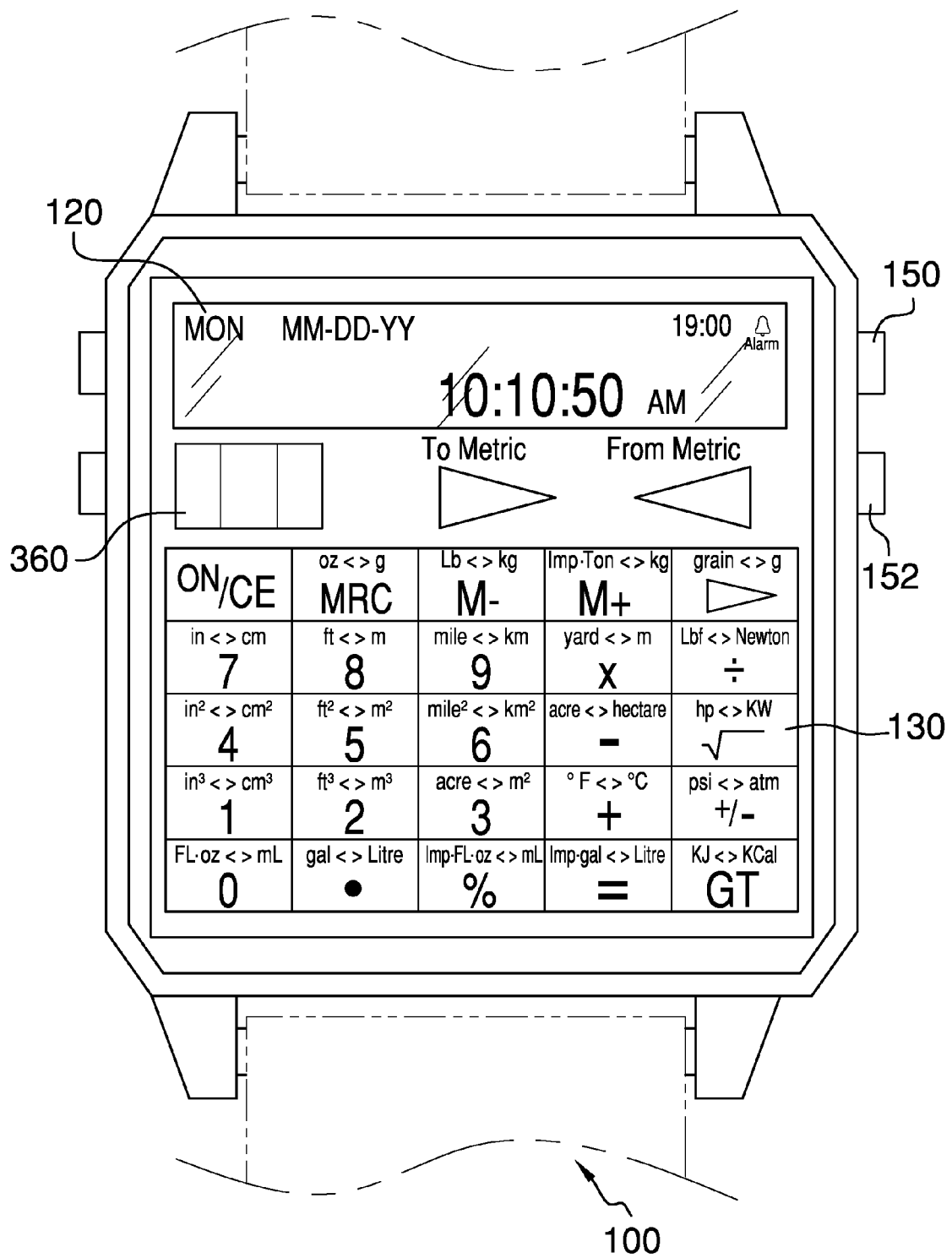
FIG. 3 is a front view of the device of FIG. 1.
Figure 4:
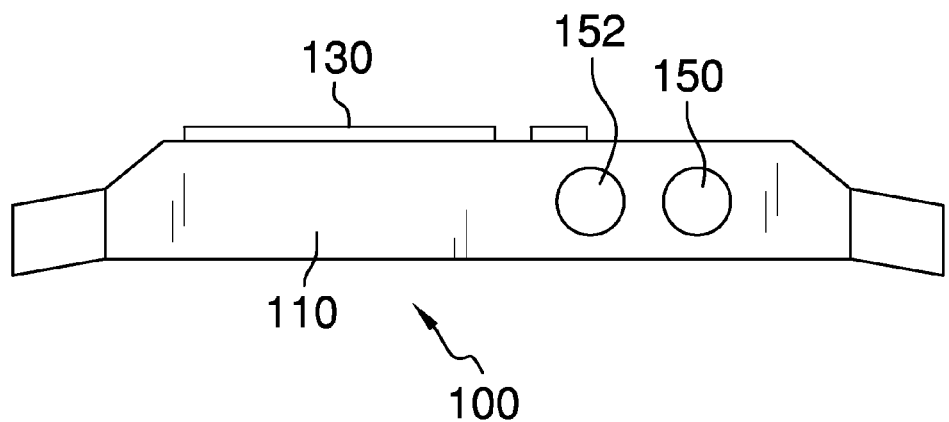
FIG. 4 is a side view of the device of FIG. 1.
Figure 5:
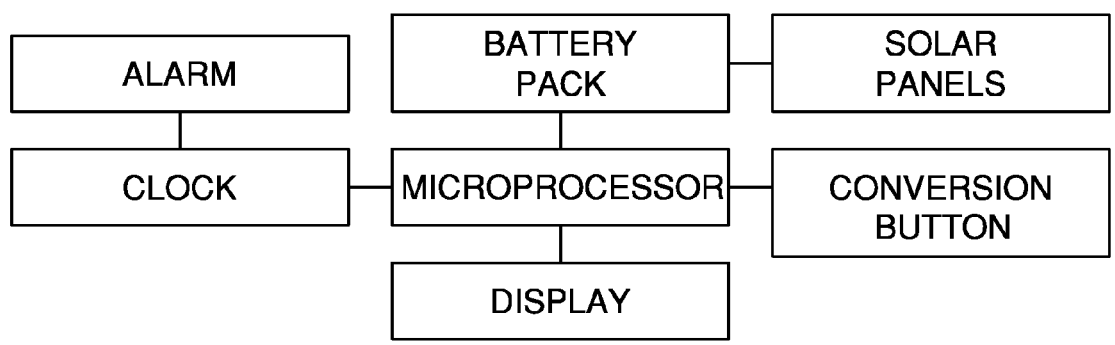
FIG. 5 is a schematic representation of the electrical components of the device of the present invention.

Referring now to FIGS. 1-5, the present invention features a metric-converter watch device 100 configured with a calculator that can convert units (e.g., metric units to English units, English units to metric units). The metric-converter watch device 100 comprises a housing 110 which may be shaped similar to a standard digital watch, well known to one of ordinary skill in the art. For example, the housing 110 may be appropriately small to be worn as a watch. The housing 110 may have a first side 111, a second side 112, a third side 113, a fourth side 114, a top surface 115, and a bottom surface 116.

Disposed on the housing 110, for example on the top surface 115 of the housing 110, is a display panel 120 (e.g., liquid crystal display (LCD) panel) and a numeric keypad 130. The display panel 120 and numeric keypad 130 are similar to standard display panels and keypads of digital watches, well known to one of ordinary skill in the art. In some embodiments, the display panel 120 can display the day of the week, the month, the year, the time, and numerical values for calculating purposes. The display panel 120 may display at least 8 digits. In some embodiments, the housing 110 comprises an alarm and/or a timer. Alarms and times are well known to one of ordinary skill in the art. One or more control buttons for controlling features such as the alarm, the date, the timer, and the like. In some embodiments, the device 100 comprises a select button 150. In some embodiments, the device 100 comprises a mode button 152. Other features of the device 100 may include: automatic power off, backlight with after glow, world time tables, daylight savings time modifications, calendars, 12-hour or 24-hour format for time, waterproof, countdown timer, and the like.

The numeric keypad 130 comprises a variety of keypad buttons (see FIG. 3) many of which may be similar to standard keypad buttons on watches and calculators. In some embodiments, the keypad buttons include "MRC" for total memory recall/clear (to recall total memory press MRC once and to clear memory press MRC twice), "M+" for memory plus, "M−" for memory minus, "ON/CE" to turn on the calculator and/or to clear all entries, "▷" for correction, numerical keys such as "0", "1", "2", "3", etc., "GT" for grand total, "%" for percent, "+" for addition, "−" for subtraction, "x" for multiplication, "÷" for division, "+/−" for positive and negative, "√" for square roots, "." for decimals, and/or "=" for equals.

The device 100 further comprises a microprocessor configured to perform mathematical operations. The microprocessor comprises circuitry for performing calculations such as standard calculations (e.g., addition, subtraction, multiplication, division, and the like). The microprocessor can also perform functions including: memory plus, memory minus, memory recall clear, percent, square root, exponent, decimal place, equals, and any other standard function found in calculators.

The microprocessor is also configured to convert a numeric value from a metric unit to an English unit or an English unit to a metric unit. Programs of this nature for microprocessors are well known to one of ordinary skill in the art. For example, a first numerical value may be multiplied by a conversion factor to calculate a first resulting value. Table 1 lists several conversion factors. The present invention is not limited to the values and conversion factors in Table 1.

TABLE 1

| Numerical Value | Conversion Factor | Resulting Value |
|---|---|---|
| in | 2.5400005 | cm |
| cm | 0.3937007 | in |
| ft | 0.3048 | m |
| m | 3.2808398 | ft |
| mi | 1.6093002 | km |
| km | 0.6213881 | mi |
| yd | 0.9144 | m |
| m | 1.0936132 | yd |
| $in^2$ | 6.4516004 | $cm^2$ |
| $cm^2$ | 0.1550003 | $in^2$ |
| $ft^2$ | 0.0929 | $m^2$ |
| $m^2$ | 10.764262 | $ft^2$ |
| $mi^2$ | 2.5898 | $km^2$ |
| $km^2$ | 0.3861302 | $mi^2$ |
| acre | 0.4046944 | hectare |
| hectare | 2.4710003 | acre |
| acre | 4046.9445 | $m^2$ |
| $m^2$ | 0.0002471 | acre |
| $in^3$ | 16.387022 | $cm^3$ |
| $cm^3$ | 0.0610239 | $in^3$ |
| $ft^3$ | 0.028317 | $m^3$ |
| $m^3$ | 35.314475 | $ft^3$ |
| Fl oz | 29.574074 | ml |
| ml | 0.0338134 | Fl oz |
| gal | 3.785401 | liter |
| liter | 0.2641728 | gal |
| Imp fl oz | 28.410059 | ml |
| ml | 0.0351988 | Imp fl oz |
| Imp. Gallon | 4.546 | Liter |
| Liter | 0.2199736 | Imp. Gallon |
| Ounce | 28.350055 | Gallon |

TABLE 1-continued

| Numerical Value | Conversion Factor | Resulting Value |
|---|---|---|
| Gallon | 0.0352733 | Ounce |
| Pound | 0.4536 | Kilogram |
| Kilogram | 2.2045855 | Pound |
| Imp. Ton | 1016.0536 | Kilogram |
| Kilogram | 0.0009842 | Imp. Ton |
| Grain | 0.0647987 | Gram |
| Gram | 15.4324 | Grain |
| Lbf | 4.4482204 | Newton |
| Newton | 0.224809 | Lbf |
| Hp | 0.7354996 | Kw |
| Kw | 1.35962 | Hp |
| Psi | 0.0680459 | Atm |
| Atm | 14.69595 | Psi |
| Kj | 0.238846 | Kcal |
| Kcal | 4.1867981 | Kj |
| Fahrenheit | (x − 32)/1.8 | Celsius |
| Celsius | 1.8x + 32 | Fahrenheit |

The microprocessor is operatively connected to a first conversion button 172 (e.g., "to metric") and a second conversion button 174 (e.g., "from metric"). The microprocessor is also operatively connected to the display panel 120.

The microprocessor is configured to receive a first input signal from the first conversion button 172 when the first conversion button 172 is depressed. The microprocessor then generates a first output command to the display panel 120 to recall the numeric value (e.g., a first numerical value) that is at that moment displayed on the display panel 120. The microprocessor then calculates a second numeric value that corresponds to the first numeric value in a metric unit. The microprocessor then generates a second output command to the display panel 120 to display the second numeric value.

The microprocessor is configured to receive a second input signal from the second conversion button 174 when the second conversion button 174 is depressed. The microprocessor then generates a third output command to the display panel 120 to recall the numeric value (e.g., a third numerical value) that is at that moment displayed on the display panel 120. The microprocessor then calculates a fourth numeric value that corresponds to the third numeric value in an English unit. The microprocessor then generates a fourth output command to the display panel 120 to display the fourth numeric value.

The microprocessor is operatively connected to a battery. In some embodiments, the battery is operatively connected to a solar panel. Solar panels are well known to one of ordinary skill in the art. In some embodiments, the solar panel functions to recharge the battery. The battery may be disposed in a battery compartment 230. The battery compartment 230 may be disposed in the bottom surface 116 of the housing 110).

In some embodiments, the microprocessor is operatively connected to the clock and/or to the alarm.

The housing 110 may be constructed from a variety of materials and in a variety of sizes. In some embodiments, the housing 110 is constructed from titanium, stainless steel, a plastic, the like, or a combination thereof. The housing 110 may be covered with a glass cover.

In some embodiments, the housing 110 is between about 25 to 30 mm in width as measured from the first side edge 111 to the second side edge 112. In some embodiments, the housing 110 is between about 30 to 35 mm in width as measured from the first side edge 111 to the second side edge 112.

In some embodiments, the housing 110 is between about 35 to 45 mm in length as measured from the third side edge 113 to the fourth side edge 114. In some embodiments, the housing 110 is between about 45 to 55 mm in length as measured from the third side edge 113 to the fourth side edge 114.

As used herein, the term "about" refers to plus or minus 10% of the referenced number. For example, an embodiment wherein the housing 100 is about 30 mm in width includes a housing 110 that is between 27 and 33 mm in width.

The following the disclosures of the following U.S. Patents are incorporated in their entirety by reference herein: U.S. Pat. No. 4,109,315; U.S. Pat. No. 4,141,074; U.S. Pat. No. 4,158,285; U.S. Pat. No. 4,093,992; U.S. Pat. No. 5,265,009. U.S. Pat. No. 4,041,295; U.S. Pat. No. 4,228,516.

Various modifications of the invention, in addition to those described herein, will be apparent to those skilled in the art from the foregoing description. Such modifications are also intended to fall within the scope of the appended claims. Each reference cited in the present application is incorporated herein by reference in its entirety.

Although there has been shown and described the preferred embodiment of the present invention, it will be readily apparent to those skilled in the art that modifications may be made thereto which do not exceed the scope of the appended claims. Therefore, the scope of the invention is only to be limited by the following claims.

What is claimed is:

1. A metric-converter watch device consisting of:

(a) a small watch-shaped housing having a display panel and a numeric keypad, both disposed on a top surface; and (b) a microprocessor configured to perform mathematical operations and configured to convert a first English numeric value to a first metric numeric value and convert a second metric numeric value to a second English numeric value, wherein the microprocessor is operatively connected to a first conversion button, to a second conversion button, and the display panel, wherein the microprocessor is configured to:

receive a first input signal from the first conversion button when the first conversion button is depressed, after which the microprocessor generates a first output command to the display panel to recall the first English numeric value displayed on the display panel, after which the microprocessor then calculates the first metric numeric value by multiplying the first English numeric value by a first conversion filter, and the microprocessor then generates a second output command to the display panel to display the first metric numeric value; and receive a second input signal from the second conversion button when the second conversion button is depressed, after which the microprocessor generates a third output command to the display panel to recall the second metric numeric value displayed on the display panel, after which the microprocessor then calculates the second English numeric value by multiplying the second metric numeric value by a second conversion factor, and the microprocessor then generates a fourth output command to the display panel to display the second English numeric value;

wherein the conversion between metric units and English units comprises dimension in length, area, weight, volume, temperature, energy, power, pressure and force;

wherein the microprocessor is operatively connected to a battery, the battery being operatively connected to a solar panel disposed on the housing, wherein the solar panel provides power to re-charge the battery.

2. The device of claim 1, wherein the first conversion factor or the second conversion factor is selected from the group consisting of: 2.5400005, 0.3937007, 0,3048, 3.2808398, 1.6093002, 0.6213881, 0.9144, 1.0936132, 6.4516004, 0,1550003, 0.0929, 10.764262, 2.5898, 0.3861302, 0.4046944, 2.4710003, 4046.9445, 0.0002471, 16.387022, 0.0610239, 0.028317, 35.314475, 29.574074, 0.0338134, 3.785401, 0.2641728, 28.410059, 0.0351988, 4.546, 0.2199736, 28.350055, 0,0352733, 0.4536, 2.2045855, 1016.0536, 0.0009842, 0.0647987, 15.4324, 4.4482204, 0.224809, 0.7354996, 1.35962, 0,0680459, 14.69595, 0.238846, 4.1867981, (x−32)1.8, and 1.8x+32.

3. The device of claim 1, wherein the display panel is a liquid crystal display panel.

4. The device of claim 1, wherein the display panel can display at least eight digits.

5. The device of claim 1 further comprising an alarm function.

6. The device of claim 1 further comprising a timer function.

\* \* \* \* \*